United States Patent
Galea

(10) Patent No.: US 6,680,447 B2
(45) Date of Patent: Jan. 20, 2004

(54) MOUNTING UNIT FOR INSERTION INTO A MOUNTING OPENING

(75) Inventor: Alexander Galea, Dingli (MT)

(73) Assignee: Methode Electronics Malta Ltd., Mriehel (MT)

( * ) Notice: Subject to any disclaimer, the term of this patent is extended or adjusted under 35 U.S.C. 154(b) by 0 days.

(21) Appl. No.: 10/144,755

(22) Filed: May 15, 2002

(65) Prior Publication Data

US 2002/0185882 A1 Dec. 12, 2002

(30) Foreign Application Priority Data

May 15, 2001 (DE) .......................... 101 23 538

(51) Int. Cl.[7] .................. H01H 13/04; H01H 13/08; H01H 13/10; H01H 19/04; H01H 19/08
(52) U.S. Cl. .................. 200/296; 200/520; 200/529
(58) Field of Search ................. 200/296, 17 R, 200/314, 318.1, 341, 512, 520, 526, 527, 529

(56) References Cited

U.S. PATENT DOCUMENTS

| | | | | |
|---|---|---|---|---|
| 5,586,645 A | * | 12/1996 | Bartok | ...... 200/527 |
| 5,626,223 A | * | 5/1997 | Lee | ...... 200/529 |
| 5,746,309 A | * | 5/1998 | Neyer | ...... 200/528 |
| 6,011,228 A | | 1/2000 | Leng | ...... 200/553 |
| 6,180,905 B1 | * | 1/2001 | Pollock et al. | ...... 200/527 |
| 6,191,376 B1 | * | 2/2001 | Bartok | ...... 200/529 |

FOREIGN PATENT DOCUMENTS

DE 44 47 527 12/1995

* cited by examiner

Primary Examiner—Lincoln Donovan
Assistant Examiner—K. Lee
(74) Attorney, Agent, or Firm—Jacobson Holman PLLC

(57) ABSTRACT

A mounting unit (1) formed e.g. as a switch block has a downwardly open housing (2) and a base member closing the latter and serving as an actuating element (4) for locking members (9). The actuating element (4) adapted to be urged telescopically into the housing (2) upon insertion into a mounting opening (16) actuates a crank drive for repeatable adjustment of the locking members (9). By strong pressure on the mounting unit (1) one can release the locking members (9) again in simple fashion.

10 Claims, 1 Drawing Sheet

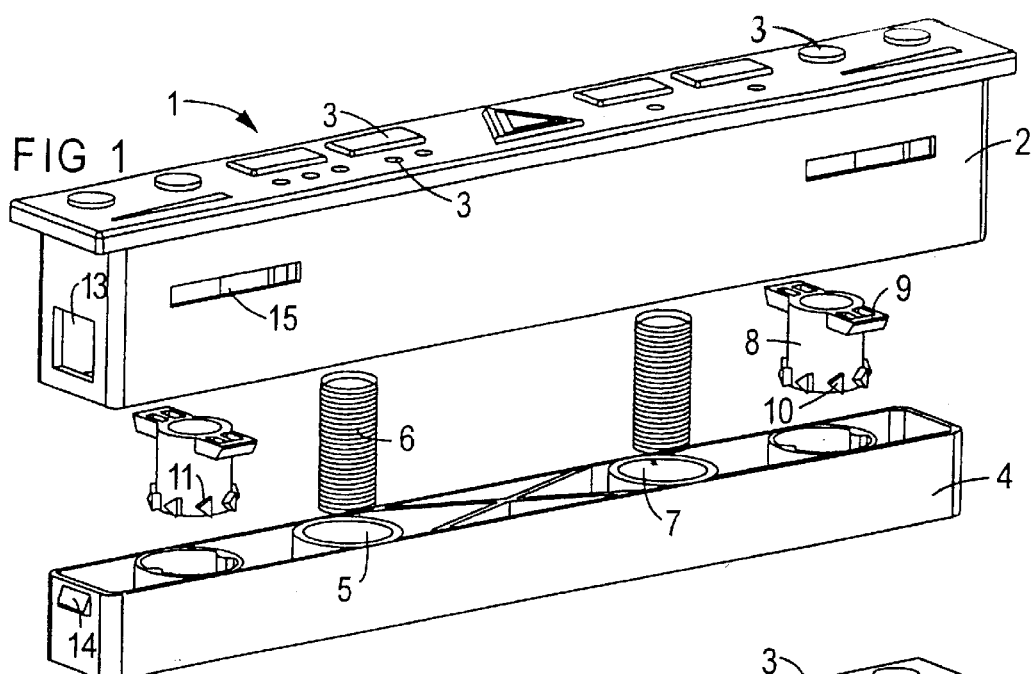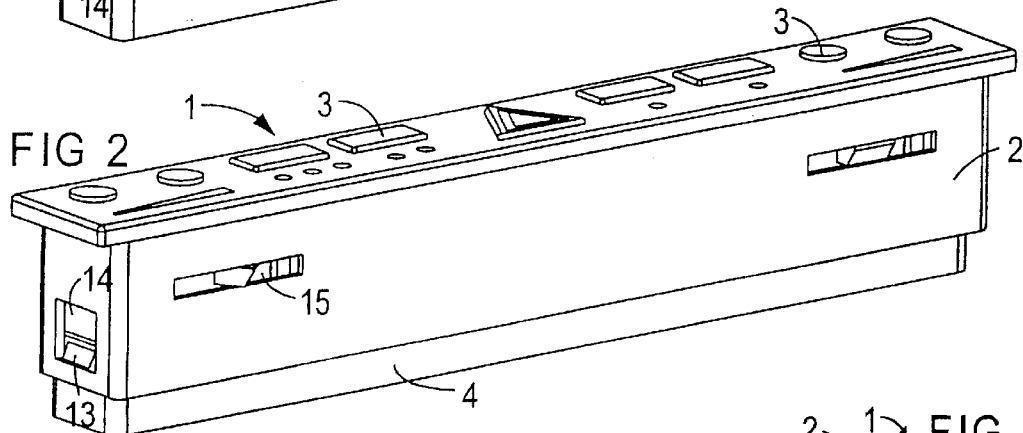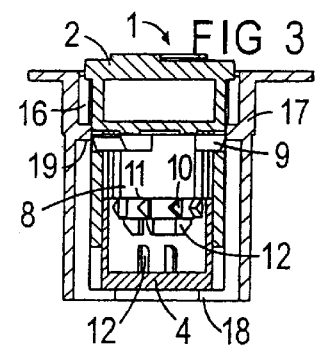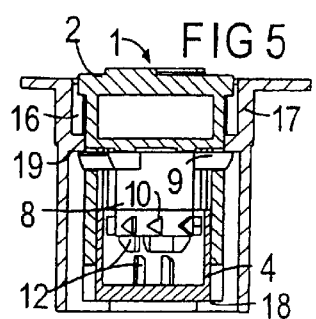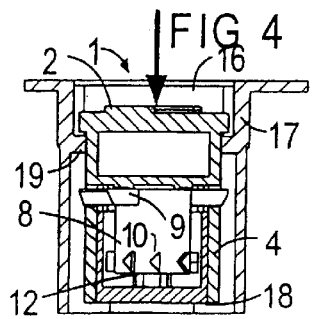

MOUNTING UNIT FOR INSERTION INTO A MOUNTING OPENING

This invention relates to a mounting unit for insertion into a mounting opening in particular of an instrument panel of a vehicle, the mounting unit having at least one locking member movable at right angles to the inserting direction and supported on a housing of the mounting unit for backgrasping a wall portion of the mounting opening.

It is customary to provide a mounting unit formed e.g. as a switch block having spreading hooks springing at right angles to the inserting direction and interlocking in shapemated fashion behind stop faces of the instrument panel after insertion into the mounting opening, whereby small vertical clearance must be maintained for reliable rebound of the hooks. For dismantling the switch block one must urge the hooks back into an unlocked position by means of a tool introduced through auxiliary openings.

Further, it is customary to provide the switch block with springy sloping locking hooks that are clamped by external force with corresponding counterslopes of the instrument panel. Diminishing spring force may lead to destabilization of the connection. To release the flush inserted switch block one needs e.g. a screwdriver-like tool that is set at the edge gap, which may cause visible damage to the surface.

The invention is based on the problem of facilitating particularly the dismantling of the component.

This problem is solved by the invention according to claim 1. The crank elements and the slide with the actuating member or the slide are integrally connected in simple fashion. The mounting unit can be introduced into the mounting opening smoothly e.g. with the locking member retracted, without producing any undefined scratching effects on the locking members and opening edges. After being placed on the depth stop, the mounting unit needs to be telescopically compressed by simple pressure on the outside of the housing until the alternatingly acting crank elements of the slide and actuating member engage with their sloping functional surfaces and displace the locking member at least partially out of the mounting position into the locked position. The upper side of the locking member is now located below the stop shoulder of the instrument panel. When the housing is let go, the slide is displaced into its end position. The moved out locking member then comes to lie against the stop shoulder of the mounting opening free from play under the tension of the spring so that the upper side of the housing or a shield mounted thereon can assume a defined vertical position in the instrument panel.

For removal of the mounting unit, the housing can be urged into the mounting opening again in simple fashion by hand without the aid of a tool. The crank elements engage again, the slide is rotated further, and the lock is released by the locking member being swung back into the housing. The spring force now urges the housing out of the mounting opening beyond the installed level so that it can easily be grasped by hand and the mounting unit removed.

Advantageous developments of the invention result from the features characterized in claims 2 to 9.

The development according to claim 2 permits the slide to be rotated further with every lift in simple fashion in the manner of a ballpoint pen mechanism.

The developments according to claims 3 and 4 make it possible to increase the diametrical width of the locking members beyond the width of the component and thus make the locking members emerge on opposite sides of the housing so that the mounting unit can be fixed in the mounting opening on both sides with only one slide.

The slide can be inserted easily into the cylindrical seat according to claim 5 and is guided reliably therein.

The base plate according to claim 6 serves as a housing portion closing the underside of the housing so that no additional components are required for the actuating function.

The developments according to claims 7 and 8 permit the mounting unit to be fixed reliably in the mounting opening at four mutually removed places, the two compression springs having a bias that is considerably higher than the actuating force of the operating elements. The crank geometry is coordinated so that it only works properly upon powerful pressing on both sides so as to prevent unintentional release by accidental action.

The development according to claim 9 permits the base member to be held in the housing in simple fashion as well as the necessary actuating lift.

The dimensioning of the depth distance between the bearing surfaces of the mounting unit ensures that the latter is clamped in the mounting opening free from play, thereby exactly defining the vertical position of the upper side of the unit.

An example of the invention is shown in the drawing and will be explained in more detail in the following.

FIG. 1 shows a perspective exploded view of a mounting unit,

FIG. 2 shows in perspective the mounting unit according to FIG. 1 in the assembled state, FIG. 3 shows a cross section through the mounting unit according to FIG. 1b upon insertion into a mounting opening directly before locking, FIG. 4 shows the unit according to FIG. 3 during locking, FIG. 5 shows the unit according to FIG. 4 after locking.

According to FIGS. 1 and 2, mounting unit 1 is formed as a strip-shaped elongate switch block. Housing 2 is provided on its upper side with operating and display elements 3. Housing 2 is closed on its underside with a base member that serves as actuating element 4 and is mounted so as to be liftable in housing 2. Actuating element 4 is provided with two hollow-cylindrical openings 5 for springs 6 serving as coil compression springs clamped between housing 2 and base member 4. On both sides of openings 5 there are substantially cylindrical receiving openings 7 for receiving and guiding slides 8 formed as rotary valves.

Said slides are of substantially cylindrical form and have on their upper side radially protruding, diametrically opposed locking members 9 as well as on their underside circumferentially distributed radially protruding crank elements 10 with sloping functional surfaces 11 that cooperate alternately with corresponding crank elements 12 of actuating element 4 protruding into receiving opening 7 and covered here, and form a crank drive therewith. Housing 2 is further provided on the end faces with locking windows 13 into which corresponding locking hooks 14 of actuating member 4 protrude from inside. Locking window 13 is so high that locking hook 14 is displaceable by an actuating lift. Actuating element 4 protrudes downward out of housing 2 by this lifting height and can be urged thereinto against the force of springs 6.

On its long sides housing 2 has slit-like holes 15 for locking members 9. In right hole 15 of FIG. 2 locking member 9 is shown in its starting position or delivery position in which the slide is so adjusted that it protrudes into the housing wall from inside, but not out of the housing wall outside. To illustrate the different positions, locking member 9 is shown in left hole 15 in its locked position in which it protrudes out of the housing wall. However, the two crank drives are formed and adjusted so that such different positions cannot come about simultaneously. The particular positions are changed by stepwise rotation of the slides when actuating element 4 is urged into housing 2 and thereby actuates the crank drive.

According to FIG. 3, the mounting unit is already inserted loosely into mounting opening 16 of instrument panel 17 of an automobile, but not yet fixed. The underside of actuating element 4 rests on depth stop 18 of mounting opening 16. Retracted locking elements 9 are still located partially above stop shoulder 19 of instrument panel 17 protruding into mounting opening 16. Crank elements 10 of slide 8 are in engagement with upper crank elements of actuating element 4 and above lower crank elements 12 of actuating element 4.

According to FIG. 4, housing 2 is urged downward by pressure on its upper side in the direction of the arrow until it likewise rests on depth stop 18 with its underside. This causes crank elements 10 of slide 8 to engage lower crank elements 12 of actuating element 4, the alternatingly disposed sloping functional surfaces thereby rotating slide 8 with locking members 9 and crank elements 10 further by an angular step so that the outer corners of locking members 9 already protrude out of housing 2. Then housing 2 can be let go and urged upward by the force of springs 6.

According to FIG. 5, mounting unit 1 is in its end position in which crank elements 10 of the slide engage upper crank elements 12 of actuating element 4. In the course of this movement, slide 8 has been rotated by another angular step into its fully locked position and secured therein. The corners of locking members 9 protruding out of the housing hit with their upper side the stop shoulders of the instrument panel under the spring pressure. Mounting unit 2 is now fixed in receiving opening 16 in a precise vertical position.

In order to be able to remove mounting unit 1, one need only urge housing 2 downward at both ends to rotate slide 8 further in the same way as upon insertion. The corners of locking members 9 thereby pass out of the stop area. When let go, housing 2 is now lifted by springs 6 into the starting position shown in FIG. 3 in which the unit can be removed.

| Reference signs | |
|---|---|
| 1 | Mounting unit |
| 2 | Housing |
| 3 | Operating and display elements |
| 4 | Actuating element |
| 5 | Opening |
| 6 | Spring |
| 7 | Receiving opening |
| 8 | Slide |
| 9 | Locking member |
| 10 | Crank element |
| 11 | Functional surfaces |
| 12 | Crank element |
| 13 | Locking window |
| 14 | Locking hook |
| 15 | Hole |
| 16 | Mounting opening |
| 17 | Instrument panel |
| 18 | Depth stop |
| 19 | Stop shoulder |

What is claimed is:

1. A mounting unit (1) for insertion into a mounting opening (16) in particular of an instrument panel (17) of a vehicle, the mounting unit (1) having at least one locking member (9) movable at right angles to the inserting direction and supported on a housing (2) of the mounting unit (1) for backgrasping a stop shoulder (19) of a wall portion of the mounting opening (16), characterized in that the mounting unit (1) has at least one actuating element (4) to be placed on a depth stop of the mounting opening (16), the actuating element (4) is adapted to be urged into the housing (2) against a spring (6), the locking member (9) displaceably mounted in the housing (2) at right angles to the inserting direction is connected kinematically with a slide (8) and displaceable behind a stop shoulder (19) of the mounting opening (16), and the actuating element (4) and the slide (8) are connected with alternatingly disposed and cooperating crank elements (10, 12) forming a crank drive for repeatable actuation of the locking member (9).

2. A mounting unit according to claim 1, characterized in that the housing (2) is adapted to be urged in the manner of a push button against the actuating element (4) to be placed on the depth stop (18).

3. A mounting unit according to claim 1, characterized in that the slide (8) is mounted rotatably in the housing (2) and provided with a plurality of the circumferentially distributed crank elements (10).

4. A mounting unit according to claim 3, characterized in that the slide (8) disposed in the middle of the housing has two of the diametrically opposed locking members (9) protruding in wing-like fashion, the locking members (9) are located within the outside of the housing (2) in a mounting position and protrude out of the outside through a hole (15) of the housing (2) in a locked position.

5. A mounting unit according to claim 3, characterized in that the substantially cylindrical slide (8) is guided in a cylindrical receiving opening (7) of the actuating element (4).

6. A mounting unit according to claim 1, characterized in that the actuating element (4) is formed as a base plate closing the housing (2) and protrudes out of the housing (2) toward the depth stop (18) at least by an actuating lift.

7. A mounting unit according to claim 1, characterized in that the strip-shaped mounting unit (1) has two of the crank drives which are spaced form the end faces.

8. A mounting unit according to claim 1, characterized in that the spring (6) is formed as a coil compression spring, and two of the springs (6) are clamped between actuating element (4) and housing (2).

9. A mounting unit according to claim 1, characterized in that the housing (2) has on its end faces locking windows (13) which are engaged by locking hooks (14) of the actuating element, and the window height extending in the actuating direction is greater than the actuating lift.

10. A mounting unit according to claim 1, characterized in that the distance between the clamping surfaces of the mounting unit (1) in the delivery state is greater than the distance between the depth stop and the stop shoulder (19) of the mounting opening (16).

* * * * *